Oct. 12, 1965    E. C. BRUNS    3,210,987
PNEUMATIC MEASURING CIRCUIT
Filed Sept. 23, 1963    2 Sheets-Sheet 1
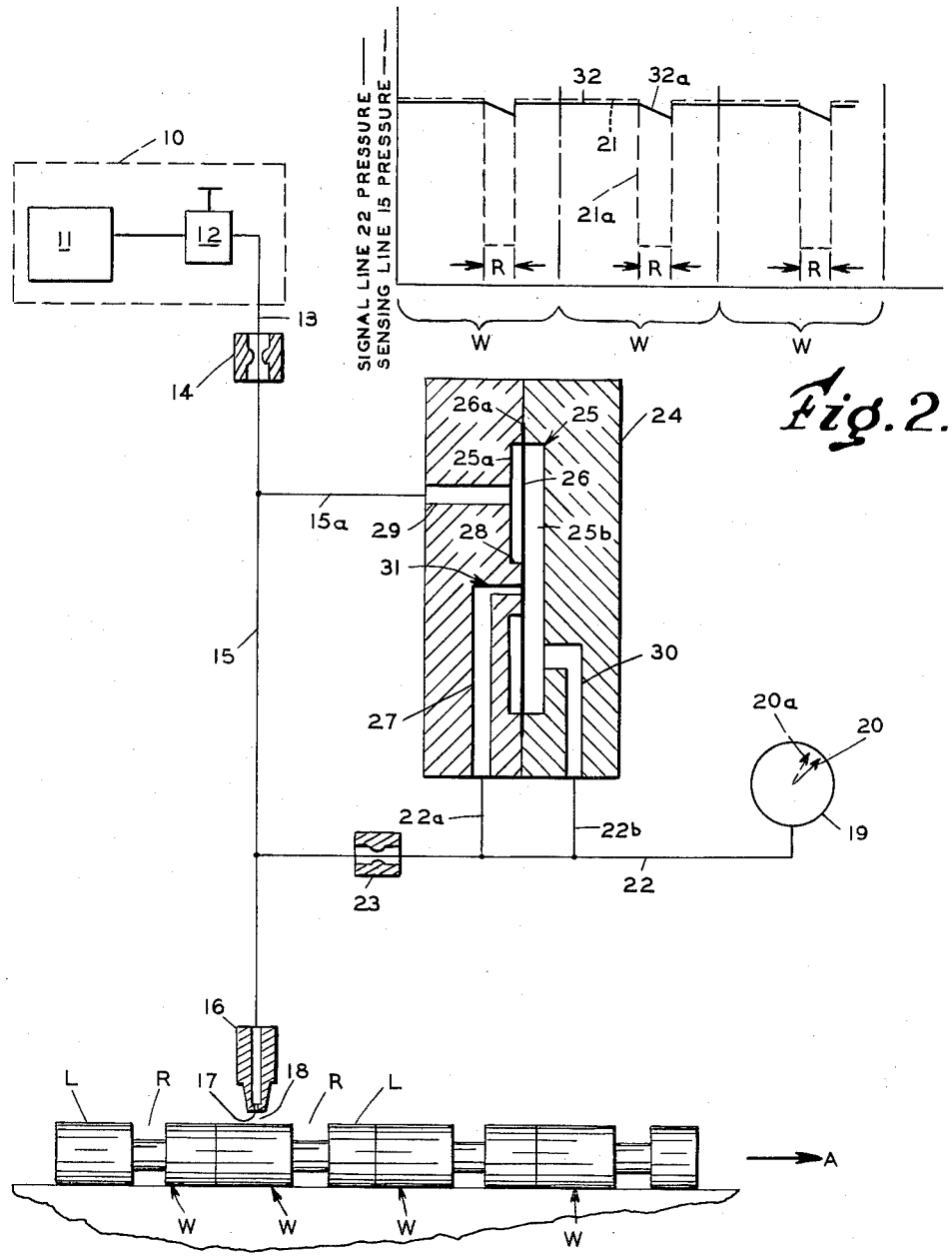
INVENTOR
EDWARD C. BRUNS
BY
Howard S. Keiser
& John F. Verhoeven
ATTORNEY

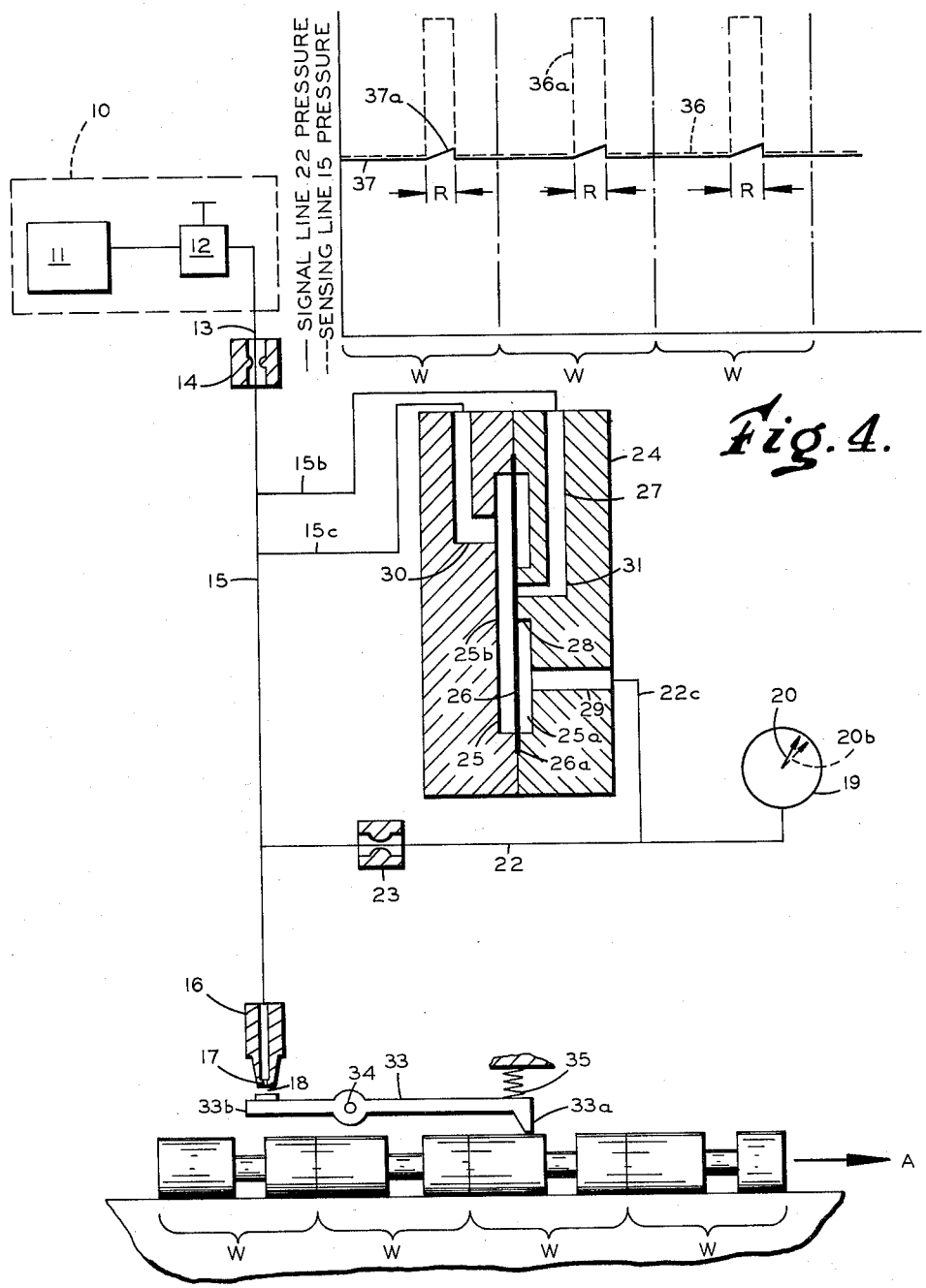

United States Patent Office 3,210,987
Patented Oct. 12, 1965

3,210,987
PNEUMATIC MEASURING CIRCUIT
Edward C. Bruns, Cincinnati, Ohio, assignor to The Cincinnati Milling Machine Co., Cincinnati, Ohio, a corporation of Ohio
Filed Sept. 23, 1963, Ser. No. 310,654
4 Claims. (Cl. 73—37.6)

The present invention relates to a pneumatic circuit for measuring which is particularly suitable for measuring moving workpieces with interrupted surfaces.

In a typical conventional pneumatic gage circuit for measuring workpieces, air is discharged from a line through an orifice positioned in closely spaced relation to the exterior surface of the workpiece to define a gap therewith. The span of the gap, which is determined by the size of the workpiece, determines the pressure in the line (the smaller the workpiece, the greater the gap, and the lower the pressure in the line). Since the pressure in the line varies in accordance with the size of the workpiece, a gage (or other workpiece size indicating device such as a pressure switch) connected to the line usually gives a reliable indication of the size of the workpiece. Alternately, the orifice, instead of being in closely spaced relation to the exterior surface of the workpiece, may confront a movable sensing member, such as a pivotal finger, engaged with the workpiece. The orifice may be positioned with respect to the movable sensing member so that the gap at the orifice is either larger for a larger workpiece or smaller for a smaller workpiece.

In some instances, as in measuring moving workpieces, it is necessary for the orifice or sensing finger to scan interrupted surfaces, or to scan workpieces moving in spaced apart relation, in which case the orifice or finger is not only confronted with lands (that is, surfaces of the workpieces to be measured) but is also confronted with interspersed recesses or voids which are not to be measured. The pressure in the line connected to the orifice (which will, for convenience, be referred to as a sensing line) fluctuates sharply as the lands and recesses alternately pass the orifice or finger (because of the great difference in the gap at the orifice). A gage connected directly to the sensing line will fluctuate sharply as the pressure in the sensing line fluctuates, and a reliable reading from the gage to indicate the instantaneous size of the lands will be difficult.

In the present invention, a circuit including a pneumatic valve having a flexible diaphragm therein is provided to minimize the effect of the recesses or voids in workpieces scanned for measuring and yet provide an almost instantaneous response of a workpiece size indicating device (such as a gage) to a change in size of the portion of the workpiece to be measured.

In brief, the gage, or other size indicating device, is connected to the sensing line, not directly, but through a restricted passage, and the pneumatic valve is connected between the line connected to the gage (which will, for convenience, be referred to as a signal line) and the sensing line around the restricted passage. The valve has a passage therein which is blocked when the pressures in the sensing line and signal line are equal. For an installation where the gap at the orifice increases when a recess is encountered, the valve is connected to the sensing line and signal line to hold the valve passage closed whenever the pressure in the sensing line is below the pressure in the signal line. However, as the pressure in the sensing line rises above the pressure in the signal line, the diaphragm is deflected to open the valve passage. Thus, when the gap increases because of a recess and the pressure in the sensing line drops sharply, the pressure in the signal line drops slowly because the signal line is connected to the sensing line, at this time, only through the restricted passage. When, however, the gap decreases because of a land and the pressure in the sensing line rises, the pressure in the signal line rises instantly because the signal line is connected to the sensing line, at this time, not only through the restricted passage, but also through the unrestricted passage through the valve. For an installation where the gap at the orifice decreases when a recess is encountered, the valve is connected to the sensing line and signal line to hold the valve passage closed whenever the pressure in the sensing line is above the pressure in the signal line. In this installation, the diaphragm deflects to open the valve passages as the pressure in the sensing line drops below the pressure in the signal line. Thus, with this latter installation, when the gap decreases because of a recess and the pressure in the sensing line rises sharply, the pressure in the signal line rises slowly because the signal line is connected to the sensing line, at this time, only through the restricted passage. When, however, the gap increases because of a land and the pressure in the sensing line drops, the pressure in the signal line drops instantly because the signal line is connected to the sensing line, at this time, not only through the restricted passage, but also through the unrestricted passage through the valve.

With the construction of the present invention, sudden, wide fluctuations in the size indicating device are avoided when a recess is encountered, but yet the gage responds almost instantly to the size of the land to be measured.

It is therefore an object of the present invention to provide a pneumatic measuring circuit which will not produce wide, sudden, fluctuations in a size indicating device when measuring interrupted surfaces but which will respond quickly to the surface to be measured.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a schematic diagram of the gage circuit of the present invention in which the gap at the orifice increases when a recess is encountered;

FIG. 2 is a graph showing pressures in the signal line and the sensing line in the circuit of FIG. 1 as the orifice alternately confronts lands and recesses;

FIG. 3 is a schematic diagram of a different embodiment of the gage circuit of the present invention in which the gap at the orifice decreases when a recess is encountered; and FIG. 4 is a graph showing pressures in the signal line and the sensing line in the circuit of FIG. 3 as the orifice alternately confronts lands and recesses.

There is shown in FIG. 1 a series of workpieces W moving as indicated by arrow A. The workpieces may, for example, be leaving the grinding throat of a centerless grinder after a through-feed grind thereon. Each workpiece has cylindrical lands, indicated at L, interrupted by annular grooves, or recesses, indicated at R.

A source 10 of air under constant pressure is defined by a source 11 of air under pressure connected to a pressure regulating valve 12. The source 10 is pneumatically connected by a line 13 to a restricted passage, or fixed restriction 14, and restricted passage 14 is connected by a line 15 to a fixed sensing member 16 which is closely spaced to the path of the moving workpieces. It will be understood that restriction 14, although fixed during any measuring operation, may be adjustable for set up purposes. The sensing member 16 has an orifice 17 through which air from source 10 is discharged into the gap 18 between the orifice and the surface of the workpiece in registration with the orifice. The orifice 17 and gap 18 define a variable restriction to flow of air, the smaller the gap, the greater the restriction to flow.

The pressure in line 13 is maintained constant by the pressure regulating valve 12. The pressure in line 15, however, varies in accordance with the size of the gap 18, and hence the pressure in line 15 (which will be referred to herein as a sensing line) responds to changes in the distance of the workpiece surfaces to the orifice 17. The portion of the circuit including source 10, line 13, restriction 14, line 15, and sensing member 16 is similar to conventional pneumatic measuring circuits.

If the surfaces of the workpieces were continuous, a gage 19, or other size indicating device such as a pressure switch, connected to line 15 would respond almost instantly to any change in size of the workpieces. The change in size of workpieces emitting from the throat of a centerless grinding machine would be small and gradual, and the gage pointer 20 would give a reliable indication of the gradually changing size of the workpieces. However, when the workpieces have recesses, such as the recesses R, or are spaced apart as they pass the orifice 17, so that the surfaces L to be measured are interrupted, the pressure in line 15 will fluctuate sharply, as indicated by dotted line 21 in FIG. 2, because of the sudden and frequent change in the size of the gap 18 as the lands L and recesses R alternately pass the orifice. If the gage were connected directly to line 15, the gage pointer 20 would jump at each change of gap size, and the true size of the surfaces L would be difficult or impossible to read.

The gage 19, in the circuit of the present invention, is not connected directly to line 15 but, instead, is connected to a line 22 (which will be referred to herein as a signal line) and responds to pressure changes in that line. Line 22 is connected to line 15 through a restricted passage, or fixed restriction 23, (which, although fixed during measuring, may be adjustable during set up as the restriction 14). Line 22 is also connected intermittently to line 15 through a pneumatically operated diaphragm valve 24.

Valve 24 has a chamber 25 which may, for example, be cylindrical. A circular flexible diaphragm 26, with its entire periphery 26a tightly secured in the valve, extends across the chamber to divide the chamber into two portions 25a and 25b separated by the diaphragm. A passage 27 in the valve, connected by branch line 22a to signal line 22, terminates at a nozzle 28 of circular cross-section extending into chamber portion 25a and abutting diaphragm 26 when the pressures in the chamber portions are equal and the diaphragm is in the position shown in FIG. 1.

Chamber 25a is connected to sensing line 15 through valve passage 29 and branch line 15a. Chamber 25b is connected to line 22 through valve passage 30 and branch line 22b. Thus, at any given instant, the pressure in chamber 25a is the same as the pressure in line 15 and the pressure in chamber 25b is the same as the pressure in line 22. Passage 27, chamber 25a, and passage 29 define a valve passage, indicated as 31, which is controlled by the diaphragm, to connect, when unobstructed, branch lines 22a and 15a, and hence lines 15 and 22. When the pressure in line 15, and hence in chamber 25a, exerts a force on the diaphragm which is greater than the force exerted thereon by the pressure in line 22 and chamber 25b, the diaphragm will flex to the right as viewed in FIG. 1, and passage 31 will be unobstructed by the diaphragm. When the force exerted on the diaphragm from the pressure in line 22, and hence in chamber portion 25b, is greater than the force exerted on the diaphragm from the pressure in line 15, and hence in chamber 25a, the diaphragm will be urged to the left against the nozzle and passage 31 will be obstructed to prevent flow therethrough. When the pressures in chamber portions 25a and 25b are equal so that there is no pressure differential on the diaphragm and the diaphragm is in the position shown in FIG. 1, passage 31 will be obstructed thereby. It is important that the diaphragm be light and flexible to respond more quickly to pressure differentials in the chambers than, for example, a spring biased check valve.

The operation of the circuit of FIG. 1 can best be understood by reference to FIG. 2 in which the pressure in the sensing line 15 is indicated by the dotted line 21 and the pressure in the signal line 22 is indicated by the solid line 32. Since there is virtually no pressure drop at restriction 23 when the rate of flow therethrough is very small, gradual or small changes of the pressure in line 15 (due to gradual or small changes in the size of lands L on the workpieces) will produce corresponding changes in the pressure in line 22. Consequently, the gage 19 will reflect changes in the size of the workpieces without undue fluctuation of pointer 20 regardless of whether the passage 31 through valve 24 is obstructed or unobstructed. However, when a recess R comes into registration with the orifice, the pressure in line 15 drops suddenly as indicated at 21a because gap 18 increases suddenly. Thus the pressure in chamber portion 25a drops suddenly. Since passage 31 is closed whenever the pressure in chamber portion 25a is equal to or less than the pressure in chamber portion 25b, the passage 31, if not closed before the sudden pressure drop in line 15, will close immediately so that fluid can flow from line 22 only through restriction 23, and the drop in pressure in line 22 will be gradual, as indicated at 32a in FIG. 2. This will cause only a gradual movement of the pointer 20. Since it is not desired to measure the depth of the recess, the fact that the gage 19 is not accurately reflecting the pressure in line 15 at this time is unimportant.

It is important, however, that the gage respond almost instantly when the orifice again confronts a land L. At this time, the pressure in line 15 jumps suddenly. If line line 22 were connected to line 15 only through restriction 23, the pressure in line 22 could rise only gradually. However, the jump in pressure in line 15 causes a jump in pressure in chamber portion 25a to a pressure above the pressure in line 22 and chamber 25b. This pressure differential on the diaphragm shifts the diaphragm to the right instantly, to open passage 31 and connect lines 15 and 22. Thus the pressure in line 22 rises sharply to the level of pressure in line 15 and the gage 19 once more accurately reflects the pressure in line 15, and hence indicates the size of the workpiece land. Unless the recess or interval between the workpieces is so large as to take considerable time to pass the orifice, the increase in pressure in line 22, although sudden, will not be great. Since the gage pointer 20 will have moved only a small amount (as to position indicated at 20a) as the pressure in line 22 was dropping gradually, the small sudden rise in pressure in line 22 will not cause the pointer to fluctuate wildly and an accurate reading can be made substantially the whole time the lands L are in registration with the orifice.

In the circuit of FIG. 3, the orifice 17 confronts a movable sensing member 33, which is illustrated as a finger pivotal about point 34 and having one end 33a urged by spring 35 toward the path of the workpieces W for engagement with the lands L thereof. The other end 33b of the finger 33 is in registration with orifice 17 and moves from a position spaced from the orifice (defining the gap 18 with the orifice) when the opposite end 33a of the finger engages a land L to a position engaging the orifice when the opposite end 33a of the finger encounters a recess R.

As in the circuit of FIG. 1, the orifice 17 is in a fixed sensing member 16 which is connected by sensing line 15 to a source 10 of air at constant pressure through a restriction 14. Thus, as a recess is encountered, the gap 18 closes and the pressure in sensing line 15 (indicated by dotted line 36 in FIG. 4) rises sharply as indicated at 36a.

As in the circuit of FIG. 1, the gage is connected by gage line 22 to sensing line 15 through a restriction 23. The valve 24 is the valve of the circuit of FIG. 1 but is connected across restriction 23 between lines 15 and 22 differently than in FIG. 1. In the circuit of FIG. 3, valve passages 27 and 30 are connected to sensing line 15 through branch lines 15b and 15c respectively. Valve passage 29 is connected to signal line 22 through branch line 22c. With these connections, a sudden rise in pressure in line 15, as a result of end 33a of the finger encountering a recess R, urges the diaphragm 26 against nozzle 28 to close valve passage 31 if it is not already closed. Thus, signal line 22, at this time, is connected to sensing line 15 only through restriction 23 and the pressure in line 22 (shown by solid lines 37 in FIG. 4) rises gradually, as indicated at 37a. When the end 33a of the finger 33 encounters a land L and gap 18 suddenly increases, the pressure in line 15 drops below the pressure in line 22. However, this produces a pressure differential on the diaphragm which deflects the diaphragm to instantly open passage 31 through the valve and connect line 22 to line 15 through the valve, in addition to the connection through restricted passage 23. Since passage 31 through the valve is unrestricted at this time, the pressure in line 22 instantly drops to the value of the pressure in line 15 and the gage pointer 20, which had risen to the position indicated at 20b when the recess passed finger end 33a, drops back to the position shown in solid line. With the pressures in lines 15 and 22 equal, the valve passage 31 will be closed. With finger end 33a in contact with a land, the change in gap 18 will be small and gradual so that any change in pressure in line 15 will be small and gradual. Even with valve passage 31 closed, the pressure in line 22 will change in accordance with the small, gradual changes in line 15 so the gage 19 will accurately indicate any change in size in the lands.

What is claimed is:

1. In a pneumatic circuit for measuring an article,
   (a) a sensing line connected to a source of air under pressure and terminating at a gap which varies when the size of the article to be measured varies,
   (b) means defining a restricted passage having one end connected to said sensing line,
   (c) a signal line connected to the other end of said restricted passage,
   (d) a size indicating device connected to said signal line,
   (e) and a pneumatic valve having a passage connecting said signal line to said sensing line around said restricted passage when the valve passage is unobstructed, said valve having a flexible diaphragm therein movable in response to a change in pressure in said sensing line to control said valve passage.

2. In a pneumatic circuit for measuring a workpiece,
   (a) a sensing line connected to a source of air under pressure and terminating at a gap which varies when the size of the workpiece to be measured varies,
   (b) means defining a restricted passage having one end connected to said sensing line,
   (c) a signal line connected to the other end of said restricted passage,
   (d) a size indicating device connected to said signal line,
   (e) and a pneumatic valve having a passage connecting said signal line to said sensing line around said restricted passage when the valve passage is unobstructed, said valve having a flexible diaphragm therein having one side exposed to pressure in said sensing line and the other side exposed to pressure in said signal line, said diaphragm movable in response to a changing pressure differential thereon to control said valve passage as the pressure changes in the sensing line.

3. A pneumatic system for measuring moving workpieces comprising
   (a) means defining a source of fluid under constant pressure,
   (b) means defining a first restricted passage having one end connected to said source,
   (c) a sensing line connected to the other end of said first restricted passage and terminating with an orifice at a gap which varies when the size of the workpiece varies, the span of said air gap determining the pressure in the sensing line,
   (d) means defining a second restricted passage having one end connected to said sensing line,
   (e) a signal line connected to the other end of said second restricted passage,
   (f) a size indicating gage connected to said signal line,
   (g) and a pneumatic valve having a chamber therein and having a flexible diaphragm extending through the chamber to divide the chamber into a first portion in communication with the sensing line and a second portion in communication with the signal line, said valve having a passage in communication with the signal line and terminating at an opening in said first chamber portion, said flexible diaphragm blocking said opening when the pressure in the sensing line is below the pressure in the signal line.

4. A pneumatic system for measuring workpieces comprising
   (a) means defining a source of fluid under constant pressure,
   (b) means defining a first restricted passage having one end connected to said source,
   (c) a sensing line connected to the other end of said first restricted passage and terminating with an orifice at a gap which varies when the size of the workpiece varies, the span of said gap determining the pressure in the sensing line,
   (d) means defining a second restricted passage having one end connected to said sensing line,
   (e) a signal line connected to the other end of said second restricted passage,
   (f) a size indicating gage connected to said signal line,
   (g) and a pneumatic valve having a chamber therein and having a flexible diaphragm extending through the chamber to divide the chamber into a first portion in communication with the signal line and a second portion in communication with the sensing line, said valve having a passage in communication with the sensing line and terminating at an opening in said first chamber portion, said flexible diaphragm blocking said opening when the pressure in the sensing line is above the pressure in the signal line.

References Cited by the Examiner

UNITED STATES PATENTS

| | | | |
|---|---|---|---|
| 2,841,006 | 7/58 | Baker | 73—37.9 |
| 2,897,670 | 8/59 | Bentley | 73—37.8 |

ISAAC LISANN, *Primary Examiner.*

LOUIS R. PRINCE, *Examiner.*